US008611562B2

(12) United States Patent
Cooper

(10) Patent No.: US 8,611,562 B2
(45) Date of Patent: Dec. 17, 2013

(54) SOUND MIXING CONSOLE

(75) Inventor: Alex Cooper, Kidderminster (GB)

(73) Assignee: Red Chip Company Ltd., Tortola (VG)

( * ) Notice: Subject to any disclaimer, the term of this patent is extended or adjusted under 35 U.S.C. 154(b) by 814 days.

(21) Appl. No.: 12/294,335

(22) PCT Filed: Mar. 12, 2007

(86) PCT No.: PCT/GB2007/000846
§ 371 (c)(1),
(2), (4) Date: Apr. 8, 2009

(87) PCT Pub. No.: WO2007/110576
PCT Pub. Date: Oct. 4, 2007

(65) Prior Publication Data

US 2009/0304207 A1 Dec. 10, 2009

(30) Foreign Application Priority Data

Mar. 28, 2006 (GB) .................................. 0606119.6

(51) Int. Cl.
*H04B 1/00* (2006.01)

(52) U.S. Cl.
USPC .......................................... 381/119; 381/123

(58) Field of Classification Search
USPC ............. 381/56, 58, 104–109, 119; 715/700, 715/716, 717; 700/94; 340/4.37, 815.46
See application file for complete search history.

(56) References Cited

U.S. PATENT DOCUMENTS 5,892,938 A * 4/1999 Eastty et al. ...................... 710/8
5,940,521 A * 8/1999 East et al. ..................... 381/119
6,061,458 A 5/2000 East et al.
7,742,609 B2 * 6/2010 Yeakel et al. ................. 381/119
2002/0107592 A1 * 8/2002 Craig .............................. 700/94
2004/0066943 A1 * 4/2004 Kato ............................ 381/119
2004/0179695 A1 * 9/2004 Terada et al. ................... 381/56
2005/0054305 A1 * 3/2005 Hagiwara et al. ............. 455/126
2006/0022956 A1 * 2/2006 Lengeling et al. ............ 345/173

FOREIGN PATENT DOCUMENTS

| | | | |
|---|---|---|---|
| CN | 1530898 | A | 9/2004 |
| CN | 1592091 | A | 3/2005 |
| EP | 1 469 624 | | 10/2004 |
| EP | 1 513 277 | | 3/2005 |
| GB | 2 330 669 | | 4/1999 |
| JP | 8-316752 | A | 11/1996 |
| JP | 2004-127807 | A | 4/2004 |
| JP | 2005-80264 | A | 3/2005 |
| WO | 99/37046 | | 7/1999 |

* cited by examiner

*Primary Examiner* — Steven J Fulk
*Assistant Examiner* — Eric Ward
(74) *Attorney, Agent, or Firm* — Seed IP Law Group PLLC

(57) ABSTRACT

A sound mixing console operative for combining or processing sound signals of a plurality of input channels is described. The sound mixing console (1) comprises a plurality of sound signal input channels (2*a*, 2*b*, 2*c* . . . ), an input channel fader control system (10, 12) having a plurality of input channel faders (16) which can be selectively coupled to respective ones of said plurality of sound signal input channels (2*a*, 2*b*, 2*c* . . . ). A master section (14) has a plurality of control group faders (17) each for collective control of a different selected group of sound signal input channels. Means are provided for coupling the sound signal input channels (36) of one of said selected groups to respective input channel faders (16) thereby to permit individual adjustment of the sound signals of the input channels of said selected group.

16 Claims, 6 Drawing Sheets

| | | | |
|---|---|---|---|
| Page 1 | Channel 1 | Drum 1 | VCA 1 (Drums) |
| | Channel 2 | Drum 2 | VCA 1 (Drums) |
| | Channel 3 | Drum 3 | VCA 1 (Drums) |
| | Channel 4 | Drum 4 | VCA 1 (Drums) |
| | Channel 5 | Drum 5 | VCA 1 (Drums) |
| | Channel 6 | Drum 6 | VCA 1 (Drums) |
| | Channel 7 | Drum 7 | VCA 1 (Drums) |
| | Channel 8 | Drum 8 | VCA 1 (Drums) |
| | Channel 9 | Drum 9 | VCA 1 (Drums) |
| | Channel 10 | Drum 10 | VCA 1 (Drums) |
| | Channel 11 | Bass Guitar | VCA 2 (Bass) |
| | Channel 12 | Keyboards 1 | VCA 3 (Keys) |

| | | | |
|---|---|---|---|
| Page 2 | Channel 13 | Keyboards 2 | VCA 3 (Keys) |
| | Channel 14 | Keyboards 3 | VCA 3 (Keys) |
| | Channel 15 | Keyboards 4 | VCA 3 (Keys) |
| | Channel 16 | Keyboards 5 | VCA 3 (Keys) |
| | Channel 17 | Keyboards 6 | VCA 3 (Keys) |
| | Channel 18 | Guitar 1 | VCA 4 (Guitars) |
| | Channel 19 | Guitar 2 | VCA 4 (Guitars) |
| | Channel 20 | Guitar 3 | VCA 4 (Guitars) |
| | Channel 21 | Guitar 4 | VCA 4 (Guitars) |
| | Channel 22 | Brass 1 | VCA 5 (Brass) |
| | Channel 23 | Brass 2 | VCA 5 (Brass) |
| | Channel 24 | Brass 3 | VCA 5 (Brass) |

| | | | |
|---|---|---|---|
| Page 3 | Channel 25 | Brass 4 | VCA 5 (Brass) |
| | Channel 26 | Brass 5 | VCA 5 (Brass) |
| | Channel 27 | Brass 6 | VCA 5 (Brass) |
| | Channel 28 | Brass 7 | VCA 5 (Brass) |
| | Channel 29 | Brass 8 | VCA 5 (Brass) |
| | Channel 30 | Lead vocal 1 | VCA 6 (Vocals) |
| | Channel 31 | Lead vocal 2 | VCA 6 (Vocals) |
| | Channel 32 | Backing vocal 1 | VCA 6 (Vocals) |
| | Channel 33 | Backing vocal 2 | VCA 6 (Vocals) |
| | Channel 34 | Backing vocal 3 | VCA 6 (Vocals) |
| | Channel 35 | Not used | |
| | Channel 36 | Not used | |

| | | | |
|---|---|---|---|
| Page 4 | Channel 37 | Not used | |
| | Channel 38 | Not used | |
| | Channel 39 | Not used | |
| | Channel 40 | Not used | |
| | Channel 41 | Not used | |
| | Channel 42 | Not used | |
| | Channel 43 | Not used | |
| | Channel 44 | Not used | |
| | Channel 45 | Not used | |
| | Channel 46 | Not used | |
| | Channel 47 | Not used | |
| | Channel 48 | Not used | |

*FIG. 1 (Prior Art)*

| | | | |
|---|---|---|---|
| VCA 1 page | Not used. | | |
| | Not used | | |
| | Channel 1 | Drum 1 | VCA 1 (Drums) |
| | Channel 2 | Drum 2 | VCA 1 (Drums) |
| | Channel 3 | Drum 3 | VCA 1 (Drums) |
| | Channel 4 | Drum 4 | VCA 1 (Drums) |
| | Channel 5 | Drum 5 | VCA 1 (Drums) |
| | Channel 6 | Drum 6 | VCA 1 (Drums) |
| | Channel 7 | Drum 7 | VCA 1 (Drums) |
| | Channel 8 | Drum 8 | VCA 1 (Drums) |
| | Channel 9 | Drum 9 | VCA 1 (Drums) |
| | Channel 10 | Drum 10 | VCA 1 (Drums) |

| | | | |
|---|---|---|---|
| VCA 2 page | Not used | | |
| | Not used | | |
| | Not used | | |
| | Not used | | |
| | Not used | | |
| | Not used | | |
| | Not used | | |
| | Not used | | |
| | Not used | | |
| | Not used | | |
| | Not used | | |
| | Channel 11 | Bass Guitar | VCA 2 (Bass) |

| | | | |
|---|---|---|---|
| VCA 3 page | Not used | | |
| | Not used | | |
| | Not used | | |
| | Not used | | |
| | Not used | | |
| | Not used | | |
| | Channel 12 | Keyboards 1 | VCA 3 (Keys) |
| | Channel 13 | Keyboards 2 | VCA 3 (Keys) |
| | Channel 14 | Keyboards 3 | VCA 3 (Keys) |
| | Channel 15 | Keyboards 4 | VCA 3 (Keys) |
| | Channel 16 | Keyboards 5 | VCA 3 (Keys) |
| | Channel 17 | Keyboards 6 | VCA 3 (Keys) |

| | | | |
|---|---|---|---|
| VCA 4 page | Not used | | |
| | Not used | | |
| | Not used | | |
| | Not used | | |
| | Not used | | |
| | Not used | | |
| | Not used | | |
| | Not used | | |
| | Channel 18 | Guitar 1 | VCA 4 (Guitars) |
| | Channel 19 | Guitar 2 | VCA 4 (Guitars) |
| | Channel 20 | Guitar 3 | VCA 4 (Guitars) |
| | Channel 21 | Guitar 4 | VCA 4 (Guitars) |

FIG 4a

| | | | |
|---|---|---|---|
| VCA 5 page | Not used | | |
| | Not used | | |
| | Not used | | |
| | Not used | | |
| | Channel 22 | Brass 1 | VCA 5 (Brass) |
| | Channel 23 | Brass 2 | VCA 5 (Brass) |
| | Channel 24 | Brass 3 | VCA 5 (Brass) |
| | Channel 25 | Brass 4 | VCA 5 (Brass) |
| | Channel 26 | Brass 5 | VCA 5 (Brass) |
| | Channel 27 | Brass 6 | VCA 5 (Brass) |
| | Channel 28 | Brass 7 | VCA 5 (Brass) |
| | Channel 29 | Brass 8 | VCA 5 (Brass) |

| | | | |
|---|---|---|---|
| VCA 6 page | Not used | | |
| | Not used | | |
| | Not used | | |
| | Not used | | |
| | Not used | | |
| | Not used | | |
| | Not used | | |
| | Channel 30 | Lead vocal 1 | VCA 6 (Vocals) |
| | Channel 31 | Lead vocal 2 | VCA 6 (Vocals) |
| | Channel 32 | Backing vocal 1 | VCA 6 (Vocals) |
| | Channel 33 | Backing vocal 2 | VCA 6 (Vocals) |
| | Channel 34 | Backing vocal 3 | VCA 6 (Vocals) |

FIG 4b

SOUND MIXING CONSOLE

This invention relates to sound mixing consoles and in particular but not exclusively, to those of the type used in live music performances, etc. to simultaneously process input signals from a multiplicity of sound sources.

Prior art sound mixing consoles are used in live music performances as well as in recording studios to process and combine input signals from the various sections of, for example, a rock band. These may include a drum kit, keyboards, guitars, brass instruments and vocalists. Each individual instrument may have a microphone associated with it or other means of connection to the mixing console. The mixing console allows the operator to adjust the sound character of each individual sound source (for example changing its frequency response or dynamic range) and then to combine the individual sounds together at the desired relative levels to create the overall sound of the band. This balancing process is normally controlled by a slider control or "fader" for each sound source—the position of the fader sets the volume. As music productions have become more complex, the number of input sound sources to be adjusted has grown, and mixing consoles with in excess of one hundred input channels are now common. This makes the operator's task very complex, and creates practical difficulties in providing the large number of controls necessary to control each input sound channel. Various attempts have been made to address this difficulty and otherwise improve the user interface for audio mixing. These include touch sensitive screens, and the use of a single control to operate many different parameters.

WO 9937046 relates to a sound mixing control console with a master control section having motorised knobs for controlling variable parameters such as input gain, pan, frequency equalization and the like of individual input channels. Each of plural input channels includes a dedicated fader for controlling output level and a selector switch for applying the master control section to that channel for controlling other variable parameters besides output level. A memory subsystem stores and recalls the positions of the knobs.

GB 2 330 669 relates to an audio mixing console having a fader panel comprising an array of touch-sensitive controls. Each control corresponds to a channel strip on a display screen, which shows the processing controls and devices for that channel, and the current control settings. Proximity sensing apparatus associated with the controls detects whether a user's hand is within a predetermined distance of one or more of the controls.

U.S. Pat. No. 5,940,521 relates to an audio mixing console having user controls which can be dynamically allocated to respective processing channels enabling a compact audio mixing console to be provided with full functionality, but with only a relatively small number of user operable controls including allocatable channel faders and allocatable audio signal processing control knobs and buttons, etc.

Recent technological developments include the use of digital instead of analogue mixers, the former enabling the doubling up of controls to reduce the overall number on the operator's control surface. The operator is required to navigate his way though the control layers to access the control faders desired.

One prior art attempt to solve this problem is the concept of fader paging or "layering". FIG. 1 of the drawings illustrates a table showing an arrangement of 48 input channels in a conventional paged console having only 12 sets of controls on its control surface. In this concept, instead of providing all the controls to the operator at all times, a smaller number of controls are provided, that is, the 48 channels are divided into 4 pages. The user then selects with a series of buttons whether he wishes to view and adjust the channel faders 1-12, 13-24, 25-36 or 37-48 on pages 1 to 4 respectively. As can be seen from FIG. 1, 10 drum channels might be assigned to the first 10 channels with the bass guitar and one keyboard taking channels 11 and 12 respectively. In this case, the 12 channels on the control surface, and so accessible to the operator, are the 10 drum faders, the bass guitar and keyboard faders. By switching over to the next 12 faders, the operator accesses the second 'page' of assigned faders, namely keyboards 2-6, guitars 1-4, and brass 1-3. The remaining brass 4-8 channels need to be allocated to the next 'page'. Although table 1 illustrates a sequential allocation of music sections to the channel faders, the user may design 'custom' pages having a random collection of channels as well as blocks of sequential ones.

These prior art layering systems have the disadvantage that they force the user to think in terms of channel numbers and fixed 'pages' with, in this example, 12 channels on each page. As can be seen from the example of FIG. 1, this does not align well with the musical arrangement of the band. In this case the keyboard and brass sections respectively are split between two different pages and so neither can be brought to the surface of the console at the same time. The channels of page 4 are completely unallocated. The user is required to remember which channel number and page number a particular instrument is on.

Another technique for managing the complexity of the mixing process is through the use of VCA faders, so-called because their earliest implementation used Voltage Controlled Amplifiers (VCA). These are additional slider controls, typically positioned in the "master" section of the console and are used to provide overall control of a number of the channel faders simultaneously. In other words, they can be used to control groups of channel faders together. This allows the operator to have, for example, a single fader to control all of the drums, another for the keyboard section and so on. A VCA fader does not achieve this by summing the channels and then passing the result through a fader (this would be termed an audio group or audio sub-group). The VCA fader operates by applying a control offset to the individual channel faders to which it is assigned so the effect is the same as if each fader had been moved by the same amount from its current "apparent" position. In typical consoles, software and digital processing rather than an actual VCA mechanism may provide this function. However, the term "VCA" fader is still the conventional nomenclature for these controls, which could also be referred to as "control group faders".

It is an aim of the present invention to alleviate some of the aforementioned difficulties.

According to the present invention, there is provided a sound mixing console having a plurality of sound signal input channels, the console being operative for combining or processing the sound signals of said plurality of input channels, the console comprising an input channel fader control section having a plurality of input channel faders which can be selectively coupled to respective ones of said plurality of sound signal input channels, a master section having a plurality of control group faders each for collective control of a different selected group of sound signal input channels, and means for coupling the sound signal input channels of one of said selected groups to respective input channel faders thereby to permit individual adjustment of the sound signals the input channels of said selected group.

In a preferred embodiment of the present invention, the console comprises a manually operable transducer associated with each one of the control group faders for facilitating user selection of a group of sound signal input channels associated with a given control group fader and coupling thereof to the input channel faders. The transducer may be a switch positioned in the vicinity of the associated control group fader or the control group faders may be touch sensitive to provide the manual operable transducer function. The selected group of sound signal input channels may advantageously be coupled to the input channel faders in order of channel number.

Embodiments may further include means for user assignment of sound signal input channels to the control group faders.

In a case where there are fewer channels in one of said selected groups of sound signal input channels than input channel faders within said input channel fader control section, inoperative faders are preferably disposed furthest away from the console operator's normal working position. Embodiments may advantageously be provided with a scrolling device for scrolling the coupling of the sound signal input channels of the selected group to the input channel faders in the event that there are more channels in the selected group than input channel faders within said input channel fader control section.

The coupling means may be implemented by way of logic gates or by way of a microprocessor based system.

Each control group fader and input channel fader control section may have an associated display operative for indicating the selected group of sound signal input channels. The display(s) may be provided locally relative to the control group faders and input channel fader control section or alternatively provided on a central screen or LCD. The display(s) may be operative for displaying different coloured indications representing different control group faders and their corresponding sound signal input channels. The display associated with an inoperative fader may be maintained blank.

The console may be provided with a plurality of input channel control sections, each comprising a plurality of input channel faders which can be selectively coupled to respective ones of said plurality of sound signal input channels, each of the plurality of input channel control sections representing a designated control area. Switching means may be provided for switching each of said plurality of input channels between one designated control area and another. Means may also be provided for allocating each one of the control group faders to one of said plurality of input channel control sections.

According to the present invention, there is further provided a method of operating a sound mixing console comprising: assigning groups of sound signal input channels to respective master section control group faders, and coupling a group of sound signal input channels associated with a given control group fader to an array of input channel faders. The method may advantageously include activating a switch associated with said given control group fader to couple said group of sound signal input channels to said array of input channel faders.

According to the present invention, there is further provided a sound mixing console comprising: means for assigning groups of sound signal input channels to respective master section control group faders, and means for coupling a group of sound signal input channels associated with a given control group fader to an array of input channel faders. In a preferred embodiment, means is provided for activating a switch associated with said given control group fader to couple said group of sound signal input channels to said array of input channel faders.

Embodiments of the present invention are advantageous in that they can provide a way for an operator to select which sources are to be adjusted, based on the natural musical groupings of the performers, instead of conventional techniques that rely on manual organisation of the operator.

The invention will now be further described by way of example with reference to the accompanying drawings, in which:

FIG. 1 is a table illustrating how input channels might be allocated in a page layering system according to the prior art;

Figure 5:
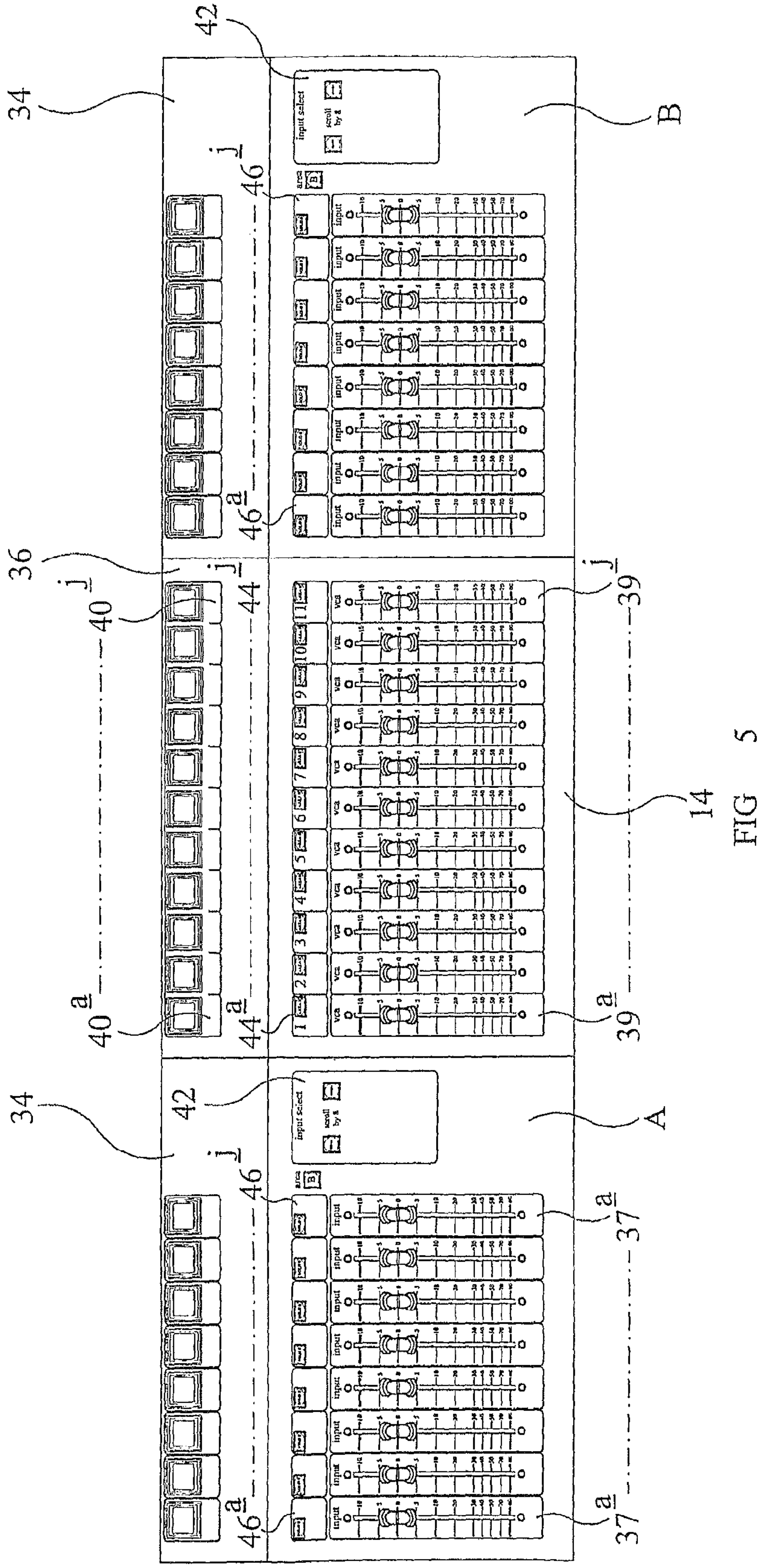

FIGS. 4*a* and 4*b* together show a table illustrating how input channels might be allocated in an embodiment of the present invention;

FIG. 5 shows two input channel fader control sections and one master section of an alternative embodiment.

Figure 2:
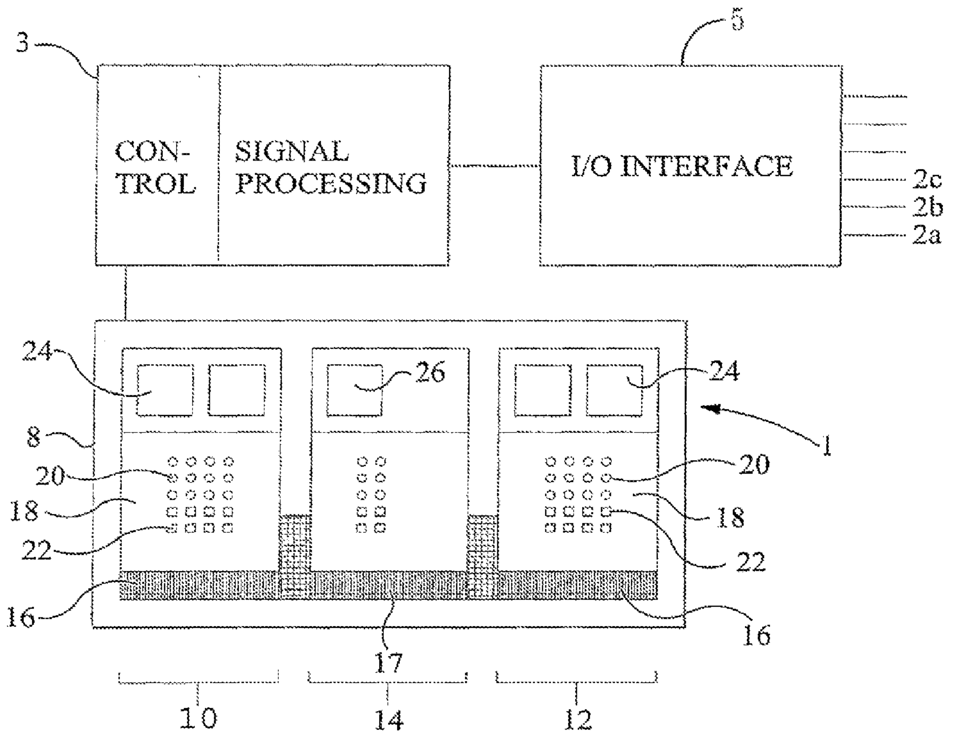
FIG. 2 is a schematic block diagram of a sound mixing console for audio signal processing embodying the present invention.

FIG. 2 illustrates a sound mixing console indicated generally by the reference numeral 1 for simultaneously processing input signals from a multiplicity of sound sources (not shown), including for example, drums, bass guitar, keyboards, guitars, brass, vocals and so on. Each of these represents a sound signal input channel 2*a*, 2*b*, 2*c* . . . . The console includes a control and signal processing unit 3 which interfaces with a sound mixer operator's front panel or desk 8. The sound signal input channels 2*a*, 2*b* etc. are fed to the control and signal processing unit 3 via an I/O interface 5. The front panel 8 comprises an array of operator controls including faders, switches, rotary controllers, video display units, lights and other indicators as will be described in more detail below.

The console 1 is connected to other devices for the communication of audio and control data between the control and signal processing unit 3 and various input/output devices (not shown) such as, for example, speakers, microphones, recording devices, musical instruments and so on. Operation of the music performance network can be controlled by the front panel or mixing desk 8 and the implementation of the necessary processing functions is performed by the control and signal processing unit 3 in response to operation of the panel controls.

As can be seen in FIG. 2, the control panel 8 of the mixing console is divided into two main sub-panels 10 and 12 with a master section 14. The sub-panels 10 and 12 are preferably configured in the same manner so that the user may use either the left hand or right hand sub-panel without having to adapt his or her mode of operation. The master section 14 contains centralised functions, which are applicable to the overall operation of the control panel and to the operation of the individual sub-panels 10 and 12.

Each sub-panel 10 and 12 is arranged with a bank of channel faders 16 adjacent to the user. These channel faders 16 are operative for adjusting the gain of selected sound input channels. Above each bank of faders 16 is a control area 18 containing a plurality of user input devices such as rotary control knobs 20 and control buttons 22. The control knobs 20 are used for adjusting control parameters and the control buttons 22 are typically used for switching in and out control functions. The master panel 14 is provided with a bank of VCA faders 17. The various user operable controls can be arranged on the control area 18 in a manner appropriate for the typical audio signal processing functions to be performed. By arranging the controls on the control area in a logical manner user operation of those controls is facilitated.

Each of the sub-panels 10 and 12 and the master section 14 includes visual displays 24, 26 for representing desired information. Also, visual indicators are associated with the buttons 22 (e.g., lights in the buttons) to indicate when they are activated and visual displays are associated with the control knobs 22 to indicate the current "position" thereof.

Figure 3:
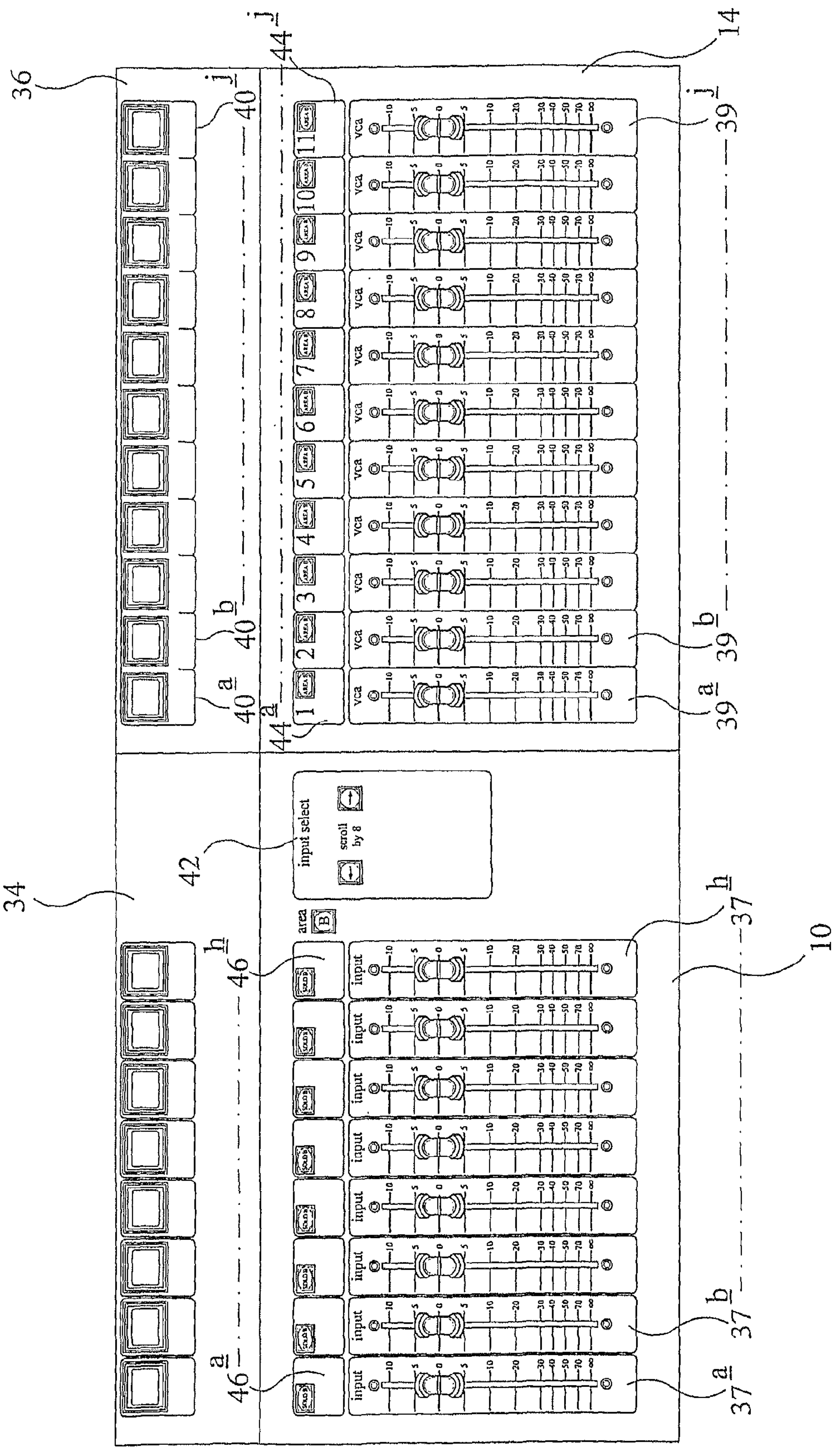
FIG. 3 shows an input channel fader control section and master section of the sound mixing console of FIG. 2.

FIG. 3 is a detailed drawing of the input channel fader control section 10 or 12 and the master section 14 of the sound mixing console 1 of FIG. 2. Banks of switches 34 and 36 (which correspond to control buttons 22 of FIG. 2) are provided above each of the control and master sections 10, 14 to allow the operator to switch control functions that are assigned to them as will be described in more detail below. The control section 10 has 8 input channel faders 37*a* to 37*h* which are selectively coupled to respective ones of the input channels 2*a*, 2*b* . . . etc.

The master section 14 has 12 control group faders 39*a* to 39*j* collectively designated by the reference numeral 16 in FIG. 2. Each of these faders, often referred to in the art as Voltage Controlled Amplifiers (VCAs), is connected to circuitry which provides for collective control of a selected group of sound signal input channels 2*a*, 2*b*, 2*c* . . . etc. as will be described in more detail below. Each control group fader 39*a*-39*j* is provided with a corresponding select switch 40*a*-40*j*, designated collectively by reference numeral 36. Each select switch 40*a*-40*j* is connected to logic gates or a microprocessor-based system that is operative for recalling those sound input channels 2*a*, 2*b*, 2*c* etc. associated with its corresponding control fader 39*a*-39*j* to the input channel faders 37*a*-37*h* of the control section 10. That is, for example, on activation of select switch 40*a*, the sound input channels assigned by the operator during set up prior to the music performance to the corresponding control fader 39*a* are coupled to the input channel faders 37*a* to 37*h*. The select switches 40*a*-40*j* may alternatively be provided by touch sensitive controls on the control group faders.

The control section 10 has buttons 42 which are operative for providing a scrolling function in cases where there are more sound input channels assigned to the selected control group fader 39*a* than input channel faders 37*a*-37*h*. So, for example, if there were 12 sound input channels 2*a*-21 assigned to the control group fader 39*a* and this fader is selected by the operator by activation of its corresponding select switch 40*a*, then 8 of the 12 sound input channels would be coupled to the 8 input channel faders 37*a*-37*h*. The operator can scroll the sound input channels to the left or right in order to access those sound input channels that are not already coupled to the input channel faders. This functionality is enhanced by coupling the sound input channels to the input channel faders in order of channel number, which if displayed on the display 24, helps the operator scroll to the desired channel. In cases where there are fewer sound input channels than input channel faders, inoperative faders are disposed furthest away from the console operator's normal working position. The corresponding display 24 is blank for the inoperative faders.

FIGS. 4*a* and 4*b* illustrate an example of an allocation of sound signal input channels in an embodiment of the present invention. When setting up the console for a music production, the operator decides how he wants to group the various participants of the production. For example, the production may consist of 10 drums, one bass guitar, 6 keyboards, 4 guitars, 8 brass players, two lead vocals and three backing vocals. His first task is to decide how he wishes to group these players together and allocate them to the various control group faders 39*a*-39*j*.

One allocation is depicted in FIGS. 4*a* and 4*b*, in which the 10 drums are all allocated to the first VCA 1 or control group fader 39*a*. The bass guitar is allocated to the second VCA 2 (control group fader 39*b*), the keyboards to the third VCA 3 or fader 39*c*, guitars to the fourth VCA 4 or fader 39*d*, brass to the fifth VCA 5 or fader 39*e* and vocals to the sixth VCA 6 or fader 39*f*. This allocation is advantageous over the prior art in that none of the music sections are split between across different pages. The operator therefore does not need to remember which sound input channel is allocated to which channel of which page as in the prior art illustration of FIG. 1. Instead, the operator can recall to the surface of the input control fader section 10 the group of sound input channels assigned to a selected VCA or group control fader 39*a*-39*j* that he allocated during the pre-performance procedures. So, if something in the brass section requires attention, pressing the select switch button on the "brass" VCA, that is, VCA 5, the system will recall all the individual brass section channels to the console surface allowing them to be adjusted.

If there are more channels in the VCA group than there are physical control sets on the surface then the lowest-numbered channels associated with that VCA will be brought to the surface. Additional buttons then allow the channels to be "scrolled" left or right to display the remaining channels.

Each VCA or control group fader 39*a*-39*j* and input channel fader 37*a*-37*h* could be provided with a display (not shown) capable of lighting up in different colours. This could be provided locally to the fader or on a centralised screen such as the display 24. The operator can then choose a different colour for each control group fader, which is then automatically copied to the input channel faders associated with that control group fader. For example, the drum control group fader might be red, the keyboard VCA green and so on. This provides the user with a very fast visual indication of which faders are currently active on the surface.

FIG. 5 shows an alternative embodiment in which two input channel fader control sections A and B and one master section 14 is provided on the console. This embodiment effectively separates the sets of input channel control faders into two input fader control sections, although more than two groups are also within the scope of the present invention. Each VCA or control group fader 39*a*-39*j* can then be provided with a selector switch 44*a*-44*j* that allows the user to pre-set which input channel fader control section A or B will be used to display that VCA's associated sound input channels. Assignment of an input channel fader control section as the area A or area B could also be dynamically controlled by select switch 46 associated with that area. This concept allows the user to keep the "most important" channels—typically the vocalists—permanently on the surface on one section (area A), while paging all the other channels onto the other section (area B).

The invention claimed is:

1. A sound mixing console, comprising:

a plurality of sound signal input channels;

an input channel fader control section having a plurality of input channel faders that are configured to be selectively coupled to respective ones of a plurality of sound signal input channels;

a master section having a plurality of control group faders, each control group fader configured to collectively control a different selected group of sound signal input channels;

a first plurality of switches, each switch associated with a respective one of the control group faders and configured to facilitate user selection of a group of sound signal input channels to be associated with a respective one of the control group faders; and a second plurality of switches configured to enable a user to selectively electrically couple the sound signal input channels of a respective selected one of the plurality of control group faders to respective input channel faders to permit individual adjustment of the sound signals of the input channels of the selected one of the plurality of control group faders, the number of input channel faders is less than the number of sound signal input channels and no fixed one-to-one relationship exists between the input channel faders and the sound signal input channels.

2. The sound mixing console according to claim 1, wherein said plurality of control group faders are touch sensitive.

3. The sound mixing console according to claim 1, wherein the selected group of sound signal input channels are coupled to the input channel faders in order of channel number.

4. The sound mixing console according to claim 1, comprising a circuit configured to enable user assignment of sound signal input channels to the control group faders.

5. The sound mixing console according to claim 1, wherein to accommodate fewer channels in one of the selected groups of sound signal input channels than input channel faders within the input channel fader control section, inoperative faders are disposed furthest away from a user's normal working position.

6. The sound mixing console according to claim 1, comprising a scrolling device configured to scroll the coupling of the sound signal input channels of the selected group to the input channel faders to accommodate more channels in the selected group than input channel faders within the input channel fader control section.

7. The sound mixing console according to claim 1, wherein at least one of the first and second plurality of switches includes logic gates.

8. The sound mixing console according to claim 1, wherein at least one of the first and second plurality of switches is included in a microprocessor based system.

9. The sound mixing console according to claim 1, wherein each control group fader and said input channel fader control section has an associated display, said display being operative to visually indicate the selected group of sound signal input channels.

10. The sound mixing console according to claim 9, wherein each display is provided locally relative to the control group faders and input channel fader control section.

11. The sound mixing console according to claim 9, wherein each display is provided on a central module.

12. The sound mixing console according to claim 9, wherein each display is configured to display different coloured indications representing different control group faders and their corresponding sound signal input channels.

13. The sound mixing console according to claim 9, wherein a display associated with an inoperative fader is configured to be blank.

14. The sound mixing console according to claim 1, comprising a plurality of input channel control sections, each control section comprising a plurality of input channel faders configured to be selectively coupled to respective ones of said plurality of sound signal input channels, each of the plurality of input channel control sections configured to represent a designated control area.

15. The sound mixing console according to claim 14, comprising switches configured to switch each of the plurality of input channels between designated control areas.

16. The sound mixing console according to claim 14, comprising a circuit configured to allocate each one of the control group faders to one of the plurality of input channel control sections.

* * * * *